United States Patent Office 3,149,000
Patented Sept. 15, 1964

3,149,000
HYDROPHILIC POLYURETHANE SPONGE
Sotirios S. Beicos, Park Forest, Ill., assignor to Simoniz Company, a corporation of Delaware
No Drawing. Filed Dec. 15, 1961, Ser. No. 159,766
2 Claims. (Cl. 117—98)

This invention relates to a hydrophilic polyurethane product.

Most polyurethane plastics whether polyether urethanes or polyester urethanes have limited use as cleaning sponges and the like because they are generally hydrophobic. The product of this invention while being a polyurethane has been treated with polyacrolein and as a result is hydrophilic. The polyacrolein treatment, which is most easily performed by dissolving the polyacrolein to make a solution and immersing the polyurethane plastic in the resulting solution, serves to give the polyurethane hydrophilic qualities which are not changed even by long term washing with flowing water.

One of the features of this invention therefore is to provide a hydrophilic polyurethane product comprising a polyurethane plastic and a polyacrolein associated therewith.

Other features and advantages of the invention will be apparent from the following description of the invention particularly with relation to certain embodiments thereof.

The manner in which the urethane sponge is prepared forms no part of the present invention. Thus, the urethane sponge may be prepared in any manner desired and it may be either a polyester or polyether sponge formed by reaction with a polyisocyanate. These methods of making urethane sponges are well known and widely described in patents as well as other scientific literature. The preparation of cellular products from free isocyanate radical-containing polyurethane products resulting from the reaction between (1) an alkyd or other active hydrogen-containing organic polymeric material and (2) organic compounds containing, as the sole reacting groups, a plurality of isocyanate groups, is described in "German Plastics Practice," by De Bell et al., 1946, pp. 315 and 463–465. Other disclosures of reactants and methods which may be employed to produce polyurethane foams applicable to this invention are U.S. Patents Nos. 2,282,-827; 2,284,637; 2,284,896; 2,292,443; 2,333,639; 2,358,-475; 2,779,689; 2,787,601; 2,788,335; 2,850,464; 2,833,-730; 2,842,506 and 2,814,600.

As an organic compound containing, as the sole reacting groups, a plurality of isocyanato groups there may be used, in the preparation of the polyurethane product, any of the poly-NCX compounds, X being oxygen, or sulfur, i.e., any polyisocyanate, any polyisothiocyanate, or any isocyanate-isothiocyanate. The polyisocyanates, because of their greater reactivity, are preferred to the polyisothiocyanates. The preferred compounds are those having two groups of the formula —NCX and, of these, the arylene diisocyanates and the arylene diisothiocyanates are, in general, more useful in the practice of the present invention and form a preferred class because of their ease of preparation, low cost, reactivity, etc. Examples of this class are: 2,4-toluene diisocyanate, 2,6-toluene diisocyanate, m-phenylene diisocyanate, 4-chloro-1,3-phenylene diisocyanate, 1-chlorophenylene, 2,4-toluene diisocyanate, and naphthalene 1,5-diisocyanate.

Active hydrogen-containing polymeric organic substances suitable for use in the preparation of polyurethane products may be selected from a wide variety of polyfunctional compounds, including polyamines, polyalcohols, aminoalcohols, polyhydroxy esters, polyamides, polythiols, polysulfonamides, and various mixtures of these types. Other long-chain polyhydroxy and polycarboxy compounds useful in this invention are alkyd resins containing terminal hydroxyl and carboxyl groups, said resins being formed by the reaction between a polyhydroxy or polycarboxy compound with a dibasic acid. Examples of the alkyd resin reactants are: glycol, glycerine, trimethylol propane, reacted with dibasic acids, such as adipic, phthalic, succinic and maleic.

The polyglycols that may be used to produce the polyurethane should be of high molecular weight with the preferred molecular weight being from about 750 to 12,000 and the especially preferred being from about 1,000 to 4,000. The polyglycols include the Pluronics, Carbowaxes of a molecular weight of about 1,000 to 6,000 and polypropylene glycols of a molecular weight of about 1,000 to 4,000.

The Pluronics are linear compounds in which water-soluble polyoxyethylene groups are at both ends of a polyoxypropylene chain. The preferred Pluronics are those of a molecular weight of at least about 1,000 up to a molecular weight of about 12,000 and containing up to about 95% and preferably between about 2–70% polyoxyethylene groups in the molecule.

The Carbowaxes are described, for example, in Chemical and Engineering News, vol. 23, Feb. 10, 1945, pages 247–251, in an article by C. P. McClelland and R. L. Bateman, "Technology of the Polyethylene Glycols and Carbowax Compounds."

Among the suitable polyglycols are also polyethylene glycols with molecular weights ranging from about 1,000 to 6,000 as Carbowax 1000, Carbowax 1540, Carbowax 4000 and Carbowax 6000, and Polyglycol E4000 and Polyglycol E6000 (the numbers indicate the molecular weight); polypropylene glycols having molecular weights ranging from about 1,000 to 4,000 such as Polypropylene Glycol 1025, Polypropylene Glycol 2025, and Polypropylene Glycol 2725, and Polyglycol P2000, Polyglycol P3000 and Polyglycol P4000 (the numbers indicate the molecular weight), and mixed polyglycols with molecular weights of about 1,000 to 4,000 such as the Pluronics, these being surface active agents obtained by condensing ethylene oxide on a polyoxypropylene base.

One general method of making the urethane foam (the words foam and sponge are used interchangeably herein) is by reacting a polyisocyanate with a compound containing an active hydrogen group such as a polyether or a polyester to produce a prepolymer. The prepolymer is then foamed by reaction with water and preferably an amine catalyst to produce carbon dioxide as a by-product which forms bubbles and results in the foams. The urethane foam may also be produced by the so-called one-shot process wherein the polyisocyanate, the active hydrogen containing compound and the foamer such as water and, preferably, a catalyst and a silicone fluid are all included in the reaction at the same time. These reactions are well known to those skilled in the art and have been the subject of much study by many researchers and research groups in this country since 1945. As is well known, the urethanes may be produced without a foam formation, if desired, and the resulting urethane may be calendered and formed much as rubber is calendered and formed.

The polyacrolein is customarily supplied in lumps or particles that contain a relatively large amount of water. This process of forming the polyacrolein forms no part of the present invention. This relatively large amount of water is present as it is difficult to remove, it is not objectionable and cannot be removed by heating because such would cause further polymerization of the polyacrolein. One commercially available polyacrolein of about 30,000 molecular weight manufactured in West Germany contains about 80% water.

The hydrophilic product of this invention has an improved water pick-up. Water pick-up may be defined as the ability of the sponge to absorb water from a surface as it is passed thereover. The improvement in percentage of water pick-up may be determined by the following test. 25 milliliters of water at 25° C. is spread over a panel 27 inches square covered by a hard plastic material such as Formica. A damp sponge such as that prepared for the damp wetting rate described below is passed over the area five times on each side, in other words, five parallel passes on one side and five parallel passes on the other side with the passes from one side perpendicular to the passes on the other side. The percent of water pick-up is then determined by taking the weight of the damp sponge before wiping and the weight of the sponge after wiping. The difference between these values divided by the 25 milliliters of water used will give the percentage of water pick-up.

Various methods of making both polyether and polyester polyurethanes are described in considerable detail in the copending application of M. C. Chen, Serial No. 74,463, filed December 8, 1960, and assigned to the same assignee as is the present application. The following two examples are representative of those for making polyurethanes with Example 1 being a method for making a polyether type and Example 2 a polyester type.

*Example 1*

A prepolymer resin was prepared by the following procedure: 444.8 lbs. of Pluronic L–61, hydoxyl number 50.5, was premixed with 63.5 lbs. of PPG–400, hydroxyl number 288.8, representing a hydroxyl equivalent ratio of .4448 to .3635. This polyol mixture should have a hydroxyl number of 80–81 and the acid number was adjusted to .03 and water content to 0.39%. To this mixture 235 lbs. of toluene diisocyanate, .002 to .003% total acidity, were added while mixing. The NCO/OH ratio was about 3.44. After 30 minutes the heat of reaction caused the temperature to rise to about 130° F. With additional heating requiring 2 hours, the mixture reached a temperature of 212° F. The reaction was allowed to proceed at 212° F. until the viscosity was about 3900–4200 centistokes. The resulting prepolymer was cooled to 100–125° F.; it contained about 9.35% free NCO. The total process took about 8½ to 9½ hours.

For each 100 parts by weight of the above prepolymer, previously adjusted to 9.8% free NCO, the following were added: 0.2 part of silicone fluid DC–200 (polydimethylsiloxane) at 25° C., 50 centistokes viscosity, 17 parts Titanox RCHT–X and .167 part Benzedine Yellow No. 12220 dye.

A catalyst solution was made as follows: 15 parts water, 1.5 parts triethyl amine and 5 parts diethylethanol amine.

The sponge material was prepared by foaming as follows:

Precision metering pumps were used to pump out the prepolymer resin/catalyst solution in the ratio of 32–25:1 to a mixing head having a capacity of 100 ml. Six triple blade turbine mixers were employed using a mixing speed of 3400 r.p.m. To facilitate the resin pumping, the resin was heated up to 120° F. The rate of pumping was 5 lbs. per minute (ca.). The mixed material was delivered to a box-shaped mold through a ⅜″ opening where foaming took place immediately. After approximately 10 minutes, the foam's rise discontinued. After 30 minutes, it was removed from the mold and crushed by running between closely spaced squeeze rollers to break any closed cell walls, then postcured at 185–190° F. for 16 hours. All said parts are by weight.

The Pluronic L–61 has the formula $$HO(C_2H_4O)_a(C_3H_6O)_b(C_2H_4O)_cH$$

It has a molecular weight of the polyoxypropylene base of about 1501–1800 and an oxyethylene content of about 10%. The PPG–400 is polypropyleneglycol with a molecular weight of about 400. The Titanox RCHT–X consists of calcium sulfate particles coated with titanium dioxide.

*Example 2*

100 parts of a polyester obtained from 1 mol of adipic acid and 1.2 mols of diethylene glycol are mixed with 3 parts of methyl diethanolamine and 2 parts of water. Thereupon 35 parts of toluene diisocyanate are added and the mixture is stirred. After hardening an elastic, odorless, foamed product of a unit weight of 60 kg./m.$^3$ is obtained.

*Example 3*

In this example a polyurethane sponge section 1 x 3¹¹⁄₁₆ x 5¹³⁄₁₆ inches of the polyurethane of Example 1 was treated to make it hydrophilic in the following manner. The commercial polyacrolein of about 30,000 molecular weight in the form of lumps containing 80% water was mixed with an equal amount of water. Sulfur dioxide was then bubbled into this mixture while the mixture was agitated to distribute the polyacrolein uniformly throughout the water until a solution of the polyacrolein resulted. The sulfur dioxide formed an acid solution, with the polyacrolein being in about a 10% by weight concentration. Then 4 parts by weight of the above solution was mixed with 96 parts by weight of water thereby diluting the polyacrolein to a 0.4% concentration.

The temperature of the solution was raised to about 167° F. (plus or minus 5° F.) and the sponge was immersed in the solution for about 4 minutes. During this immersion the sponge was compressed and released three times per minute. The sponge was then removed from the solution, wrung out and the excess solution was then removed by washing in running water until it no longer tested acid. This excess acidity may also be removed by neutralizing with an alkali such as a 0.7% concentration of sodium carbonate in water.

*Example 4*

In this example exactly the same treatment was given to a section of sponge of the same size but prepared by the method of Example 2. Here, however, the time of immersion was 10 minutes.

The polyurethane sponges treated by the methods of this invention as exemplified in Examples 3 and 4 are quite hydrophilic and the treatment is particularly effective on the polyester polyurethanes. These polyurethane sponge products treated with the polyacrolein have a very fast weting rate as determined by placing the moist sponge on the surface of water at 100° F. and measuring the speed at which water rises through the sponge. With the treated sponges the time was frequently less than two seconds per centimeter of thickness. The untreated sponges tested under the same conditions will not wet. Furthermore, the hydrophilic character appears to be permanent as the initial wetting rates of the treated polyurethanes were found to remain the same even after rinsing with 2000 gallons of warm water, that is, water at about 100° F.

Having described my invention as related to the embodiments set out herein, it is my intention that the invention be not limited by any of the details of description, unless otherwise specified, but rather be construed broadly within its spirit and scope as set out in the accompanying claims.

I claim:

1. A hydrophilic polyurethane product comprising: a cellular polyurethane plastic produced by a process which comprises reacting in the presence of a blowing agent an organic polyisocyanate with an organic compound having a plurality of hydroxyl groups reactive with an —NCO group; and polyacrolein added to said cellular plastic after the formation thereof, as a polyacrolein-sulfurous acid reaction product.

2. The product of claim 1 wherein said polyacrolein has a molecular weight of about 30,000.

References Cited in the file of this patent

UNITED STATES PATENTS

| | | |
|---|---|---|
| 2,900,278 | Powers et al. | Aug. 18, 1959 |
| 2,977,330 | Brower | Mar. 28, 1961 |
| 3,068,203 | Schweitzer | Dec. 11, 1962 |